United States Patent Office 3,824,270
Patented July 16, 1974

3,824,270
PROCESS FOR THE MANUFACTURE OF TETRACHLOROCYANOBENZENE OR TETRABROMOCYANOBENZENE
Jost von der Crone, Riehen, Switzerland, assignor to Ciba-Geigy Corporation, Ardsley, N.Y.
No Drawing. Filed Nov. 15, 1971, Ser. No. 199,003
Claims priority, application Switzerland, Nov. 13, 1970, 16,793/70
Int. Cl. C07c 121/52
U.S. Cl. 260—456 B     2 Claims

ABSTRACT OF THE DISCLOSURE

Process for the manufacture of 1-cyano-2,3,4,5-tetrachlorobenzene or 1-cyano-2,3,4,5 - tetrabromobenzene, characterised in that the ammonium salt of 2-cyano-3,4,5,6-tetrachlorobenzoic acid or 2 - cyano-3,4,5,6-tetrabromobenzoic acid is decarboxylated by warming in an aprotic solvent or in a mixture of such solvents.

---

The present invention relates to a process for the manufacture of 1-cyano-2,3,4,5-tetrachlorobenzene or 1-cyano-2,3,4,5-tetrabromobenzene. 2,3,4,5 - Tetrachlorobenzonitrile and 2,3,4,5-tetrabromobenzonitrile were already described in J. pr. Ch. (2), 53–66 (1897) by Claus and Wallbaum. The compound containing chlorine mentioned there had a melting point of 84° C. and the compound containing bromine a melting point of 124° C., and neither of the two products could be saponified to the acid. It appears that these products are not the compounds obtained according to the present process of the invention, since the latter show different melting points, namely 128–129° C. for the compound containing chlorine and 179–181° C. for the compound containing bromine, and furthermore can easily be hydrolysed, yielding the known acids.

The process according to the invention is characterised in that the ammonium salt of 2-cyano-3,4,5,6-tetrachlorobenzoic acid or 2-cyano-3,4,5,6-tetrabromobenzoic acid is decarboxylated by warming in an aprotic solvent or in a mixture of such solvents.

The ammonium salt of 2-cyano-3,4,5,6 - tetrachlorobenzoic acid and its manufacture are known, for example from "Farbe+Lack" 72, 209 (1966) and Swiss Patent Specification 348,496. The corresponding compound containing bromine can be obtained analogously to the method described for the compound containing chlorine.

The decarboxylation takes place without the use of a catalyst under mild conditions, by merely warming the ammonium salt in an aprotic solvent, for example to 30–150° C., especially to a temperature of between 50 and 90° C. The reaction already starts after a short time. The end product is obtained in a yield of about 85–95% of theory and good purity. The smooth course of the decarboxylation under these condtions is surprising, since under the same reaction conditions no significant amounts of benzonitrile are obtained from the ammonium salt of o-cyanobenzoic acid.

Aprotic solvents which can be used for the process according to the invention are, for example, those having a dielectric constant greater than 15, such as, preferably, the following compounds, which are mostly weakly basic: dimethylformamide, dimethylacetamide, N-methylpyrrolidone, dimethylsulphoxide, hexamethylphosphoric acid triamide, tetramethylurea and tetramethylenesulphone. These solvents can be employed individually or as a mixture with one or more of the following solvents: acetone, methyl ethyl ketone, cyclohexanone, nitromethane, benzene, toluene, xylene, chlorobenzene, o-dichlorobenzene, nitrobenzene, acetonitrile, propylene carbonate, ethylene glycol monomethyl ether and monoethyl ether, ethylene glycol dimethyl ether and diethyl ether, diethylene glycol diethyl ether, triethylene and tetraethylene glycol dimethyl ether, carbon tetrachloride, chloroform, tetrachloroethane, tetrahydrofurane and 1,4-dioxane. Further preferred solvents are aromatic bases, such as pyridine and quinoline.

The compounds manufactured according to the invention are valuable intermediate products in the synthesis of dyestuffs and pigments.

Example 1

30.2 g. of the ammonium salt of tetrachloro-o-cyanobenzoic acid and 200 ml. of dimethylformamide are warmed to 80–90° C. A yellowish solution is produced. After 2 hours, the solution is poured into 1 litre of cold water. The resulting precipitate is filtered off and dried. 22.5 g. of crude product=93.5% of theory, are thus obtained. The crude product is purified by recrystallisation from methanol. The recrystallised 2,3,4,5 - tetrachlorobenzonitrile is colourless and melts at 128–129° C.

2,3,4,5-Tetrachlorobenzonitrile is also produced in good yield if, in this example, the dimethylformamide is replaced by the following solvents: dimethylacetamide, dimethylsulphoxide, N-methylpyrrolidine-2, pyridine, quinoline, tetramethylsulphone (Sulfolan), hexamethylphosphoric acid triamide (Hexametapol) and tetramethylurea.

The compound can be used as an intermediate product for dyestuffs.

The compound is suitable for the manufacture of dyestuff intermediates. For example, reaction with ammonia in an autoclave at 120° C., using dimethylsulphoxide as the solvent, gives 4-amino-2,3,5-trichlorobenzonitrile in high yield; after recrystallisation this substance has a melting point of 172–173° C. This amine can be employed as a diazo component for dispersion dyestuffs. For example, coupling of the diazonium salt with N,N-(2-cyanoethyl)-N-(2-hydroxyethyl) - 3 - methylaniline of the formula

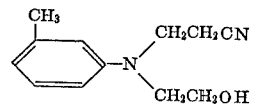

yields a red-brown dyestuff which is suitable for dyeing polyglycol terephthalate fibres. The dyestuff shows good affinity when used with dyeing methods such as are customary in practice for dispersion dyestuffs. Intensely coloured brown-orange dyeings are obtained.

Example 2

30.2 g. of the ammonium salt of 3,4,5,6-tetrachloro-o-cyanobenzoic acid in a mixture of 100 ml. of dimethylformamide and 100 ml. of acetonitrile are warmed for 3 hours under a reflux condenser. The hot solution is now treated with 500 ml. of cold water, whereupon the reaction product precipitates. It is filtered off and dried. 22 g. of 2,3,4,5-tetrachlorobenzonitrile of melting point 126–128° C. are thus obtained. The product is obtained in similarly good yield and high purity if, in this example, the acetonitrile is replaced by an equal amount of one of the following solvents: acetone, methyl ethyl ketone, cyclohexanone, ethylene glycol monomethyl ether or monoethyl ether, ethylene glycol dimethyl ether or diethyl ether, triethylene or tetraethylene glycol dimethyl ether, dioxane, tetrahydrofurane and propylene carbonate.

Example 3

10 g. of the ammonium salt of 3,4,5,6-tetrabromo-o-cyanobenzoic acid in 200 ml. of dimethylformamide are heated to 70–80° C. for 3 hours. A clear solution is formed, and from this solution the reaction product is precipitated by adding 500 ml. of water. After drying, 8.2 g. of crude 2,3,4,5-tetrabromobenzonitrile are thus obtained. After recrystallisation from isopropanol, the product melts at 179–181° C. It can be used as an intermediate product for dyestuffs and pigments.

Example 4

30.2 g. of the ammonium salt of 3,4,5,6-tetrachloro-o-cyanobenzoic acid in a mixture of 150 ml. of dimethylformamide and 150 ml. of ethyl acetate are warmed for 3 hours under a reflux condenser. Thereafter the hot solution is cooled and 500 ml. of cold water are added. The organic layer which contains the 2,3,4,5-tetrachlorobenzonitrile formed, is separated off, washed with water and dried with a drying agent. The product can now be employed directly, in this solution, for subsequent reactions, or is isolated by distilling off the ethyl acetate. 2,3,4,5-Tetrachlorobenzonitrile is also obtained as a solution if, in this example, the ethyl acetate is replaced by an equal amount of one of the following solvents and in doing so a temperature of 100° C. is not exceeded: nitrobenzene, o-dichlorobenzene, chlorobenzene, toluene, benzene, o-, m- or p-xylene, carbon tetrachloride, 1,1,2,2-tetrachloroethane and chloroform.

What I claim is:

1. A process for the manufacture of 1-cyano-2,3,4,5-tetrachlorobenzene or 1-cyano-2,3,4,5-tetrabromobenzene which comprises decarboxylating the ammonium salt of 2-cyano-3,4,5,6-tetrachlorobenzoic acid or 2-cyano-3,4,5,6-tetrabromobenzoic acid by heating in at least one aprotic solvent selected from the group consisting of dimethylformamide, dimethylacetamide, N-methylpyrrolidone, dimethylsulphoxide, hexamethylphosphoric acid triamide, tetramethylurea or tetramethylenesulphone at a temperature of 30 to 150° C.

2. A process for the manufacture of 1-cyano-2,3,4,5-tetrachlorobenzene or 1-cyano-2,3,4,5-tetrabromobenzene which comprises decarboxylating the ammonium salt of 2-cyano-3,4,5,6-tetrachlorobenzoic acid or 2-cyano-3,4,5,6-tetrabromobenzoic acid by heating in at least one aprotic solvent selected from the group consisting of pyridine or quinoline at a temperature of 30 to 150° C.

References Cited

UNITED STATES PATENTS

| | | | |
|---|---|---|---|
| 3,238,243 | 3/1966 | Falbe et al. | 260—465 |
| 3,644,470 | 2/1972 | Turk et al. | 260—465 |

OTHER REFERENCES

Claus et al.: Journal for Praktische Chemie, 2, pp. 53–66 (1897).

Okubo et al.: Chemical Abstracts, vol. 56, p. 11439, (1962).

LEWIS GOTTS, Primary Examiner

D. H. TORRENCE, Assistant Examiner

U.S. Cl. X.R.

260—207.5, 465 G